(12) United States Patent
Götte et al.

(10) Patent No.: US 10,421,539 B2
(45) Date of Patent: Sep. 24, 2019

(54) ACTUATOR FOR USE IN AVIATION

(71) Applicant: ZF Friedrichshafen AG, Friedrichshafen (DE)

(72) Inventors: Jürgen Götte, Vellmar (DE); Uwe Arnold, Kassel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 79 days.

(21) Appl. No.: 15/053,178

(22) Filed: Feb. 25, 2016

(65) Prior Publication Data
US 2016/0251079 A1    Sep. 1, 2016

(30) Foreign Application Priority Data

Feb. 26, 2015 (DE) .................. 10 2015 203 411

(51) Int. Cl.
| | |
|---|---|
| *B64C 27/68* | (2006.01) |
| *F16H 1/32* | (2006.01) |
| *F16H 3/72* | (2006.01) |
| *B64C 13/42* | (2006.01) |
| *B64C 13/50* | (2006.01) |
| *F16H 1/46* | (2006.01) |
| *F16H 1/28* | (2006.01) |

(52) U.S. Cl.
CPC ............ *B64C 27/68* (2013.01); *B64C 13/42* (2013.01); *B64C 13/50* (2013.01); *F16H 1/28* (2013.01); *F16H 1/32* (2013.01); *F16H 1/46* (2013.01); *F16H 3/727* (2013.01); *F16H 2001/323* (2013.01)

(58) Field of Classification Search
CPC ......... B64C 27/68; B64C 13/50; B64C 13/34; F16H 1/28; F16H 3/66; F16H 3/72; F16H 3/727
See application file for complete search history.

(56) References Cited

U.S. PATENT DOCUMENTS

| | | | |
|---|---|---|---|
| 3,530,355 A | 9/1970 | Hodgkins | |
| 3,679,956 A | 7/1972 | Redmond | |
| 2003/0098197 A1 | 5/2003 | Laurent et al. | |
| 2010/0150719 A1 | 6/2010 | Waide et al. | |
| 2014/0027564 A1 | 1/2014 | Mercer et al. | |
| 2014/0060249 A1 | 3/2014 | Schank et al. | |
| 2016/0257189 A1* | 9/2016 | Hata ...................... B60K 6/365 |

FOREIGN PATENT DOCUMENTS

| | | |
|---|---|---|
| DE | 10 2009 001 393 A1 | 9/2010 |
| DE | 20 2009 006 227 U1 | 11/2010 |
| DE | 11 2010 004 598 T5 | 1/2013 |
| DE | 10 2013 202 221 A1 | 10/2013 |
| DE | 10 2013 206 061 A1 | 10/2014 |

OTHER PUBLICATIONS

Search Report dated Dec. 16, 2015 for German Patent Application No. 10 2015 203 411.9, (11 pp.), note: pp. 1 and 2 are English language Explanations to Section C. Result of Determination Document.

* cited by examiner

*Primary Examiner* — Erin D Bishop

(74) *Attorney, Agent, or Firm* — Brinks Gilson & Lione

(57) ABSTRACT

An actuator for a rotor blade adjustment having an electromechanical drive unit may be connected with an output drive via a gearbox. The drive unit may have at least two partial drives that can be operated independently from one another. The gearbox may be located at least partially between the at least two partial drives such that the at least two partial drives are spaced apart from one another.

16 Claims, 3 Drawing Sheets

ACTUATOR FOR USE IN AVIATION

CROSS-REFERENCE TO RELATED APPLICATIONS

This current application claims the priority of German Patent Application DE 10 2015 203 411.9, filed on Feb. 26, 2015, which is incorporated by reference herein in its entirety.

BACKGROUND

The current embodiments relate to an actuator for aviation applications, in particular for a rotor blade adjustment, comprising an electromechanical drive unit, which is connected with an output drive via a downstream gearbox, wherein the drive unit is divided into partial drives that can be operated independently from one another.

Actuators are used in aircrafts for converting control instructions of a pilot into appropriate control functions. For example, actuators are provided for rotor blade adjustments in helicopters and initiate in the range of a swashplate its specific axial displacement to a rotor mast, as well as its transverse inclination to the rotor mast which, in the first case, allows for the realization of a collective pitch and, in the second case, a cyclic pitch of the rotor blades. Because of the fact that depending on the control instructions to be converted by the actuators their failure in worst case scenario can result in a crash of the respective aircraft, actuators have to be designed in the form of redundant systems that ensure at least a reduced functional capacity even in the event of failure of individual components.

US 2010/0150719 A1 discloses an actuator for a rotor blade adjustment in a helicopter, wherein this actuator consists of an electromechanical drive unit and a downstream gearbox. At the same time, the drive unit is designed in the form of a redundant, multiphase electric motor, which combines in one housing multiple partial drives that can be operated independently from one another.

Based on the prior art described above, the present embodiments have the object of providing an actuator for aviation applications, which is characterized by low susceptibility to damage and thus high reliability.

BRIEF DESCRIPTION OF THE DRAWINGS

The drawings show preferred embodiments, which are subsequently described in more detail. It is shown.

DETAILED DESCRIPTION

Figure 1:
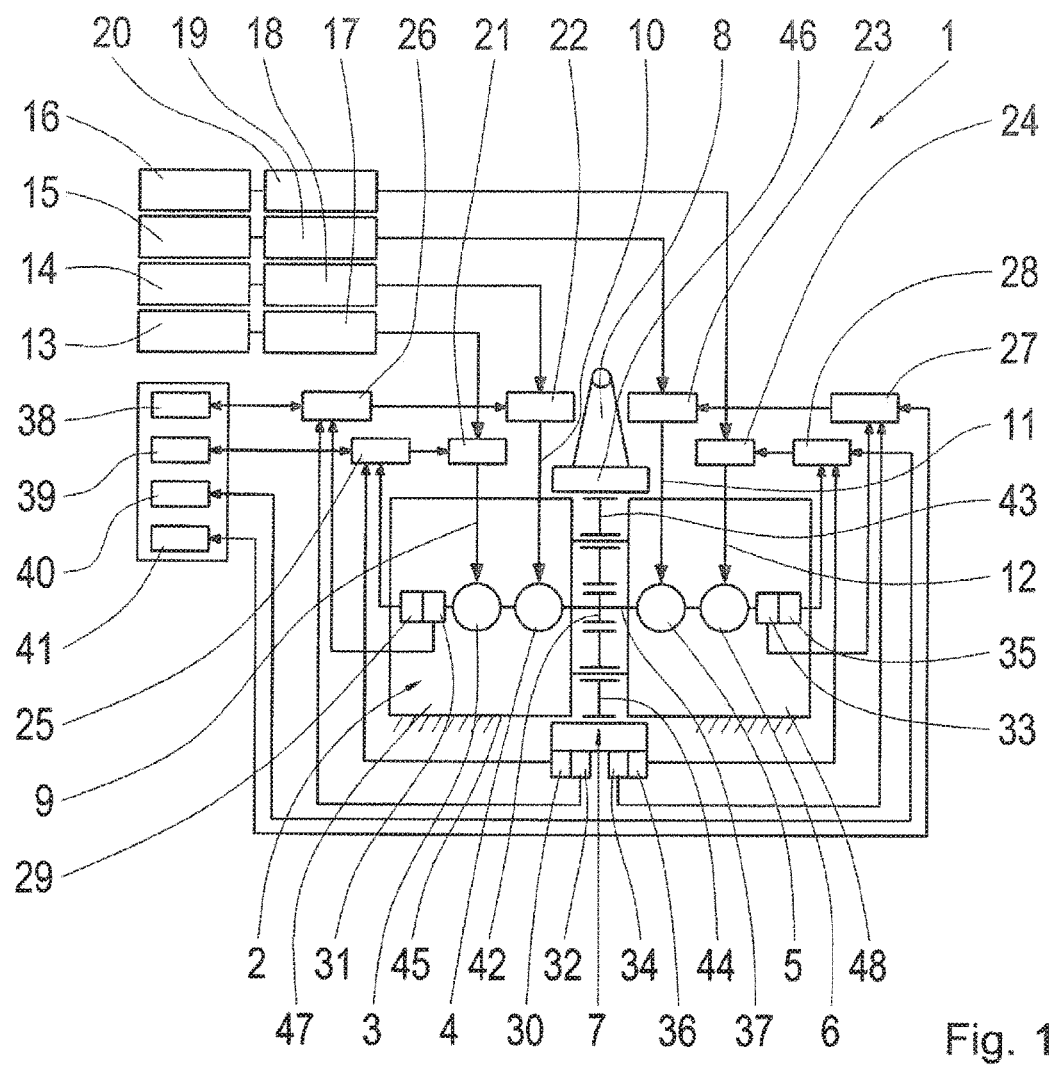
FIG. 1 a schematic view of an actuator according to a first embodiment.

An actuator for aviation applications may comprise an electromechanical drive unit, which is connected with a drive via a downstream gearbox. At the same time, the drive unit is divided into partial drives that can be operated independently from one another. In particular, the actuator is used for a rotor blade adjustment in a helicopter. In this connection, it can be designed for moving a swashplate by means of which a blade adjustment of the rotor blades of the helicopter can be implemented, or for single-blade adjustment wherein, in this case, the actuator is arranged between the single-blade and the rotor head of the main, or tail rotor. However, the actuator can be used also in different areas and different aircrafts, for example, airplanes, here to be used for flap control or operating a control, such as an aileron or elevator.

The partial drives of the electromechanical drive unit that can be operated independently from one another are realized in that each partial drive can be independently controlled and supplied with energy. For this purpose, depending on the number of phases, each partial drive is provided with at least one generator with a downstream rectifier, which is connected with the partial drive via a supply line (lane). Especially partial drives with a high number of phases can be provided with multiple generators, rectifiers and lanes in order to supply the windings. Depending on the number of phases, the control of the respective partial drive is performed by means of one or multiple power control units (PCU), which, in turn, is controlled via an associated actuator control unit (ACU). The overall control is performed by means of multiple flight control computers (FCC), which are supplied also with information from multiple sensors.

The current embodiment comprise the technical information that at least two partial drives are spaced apart from one another by providing the gearbox between these partial drives. In other words, the gearbox is provided between at least two partial drives and physically separates them from one another by providing one partial drive on one side of the gearbox and the other partial drive on the other side of the gearbox.

Such an embodiment of an actuator has the advantage that it is more difficult for damages to one partial drive, for example, by fire, can result also in damages to the other partial drive, because the gearbox is situated between the two partial drives. This reduces the actuator's susceptibility to damage and increases its overall reliability. At the same time, the actuator is still designed in the form of a redundant system, which comprises partial drives that can be operated independently from one another, which ensures a certain control function even in the event of single failures.

However, in the actuator described in US 2010/0150719 A1, the partial drives are combined in a motor housing, which allows for compact construction but, in the case of certain damages to a partial drive, such as a fire resulting from cable fire, it could lead also quickly to damages of the remaining partial drives. In an extreme case, this could result in failure of the complete actuator.

According to one embodiment, a partial drive is provided, respectively, on both sides of the gearbox. In a further development of this embodiment, each partial drive is designed in the form of an electric motor with six phases. Preferably, two 3-phase motors are combined to one electric motor, which allows for compact construction. It is further preferred that the electric motor with six phases is provided with two supply lines (lanes), two power control units (PCUs) and two actuator control units (ACUs), which are respectively associated with three of the six phases. Furthermore, a special internal redundancy is formed by performing a spatial, thermal, magnetic and electrical separation of the individual phases in that the windings associated with the lanes, PCUs and ACUs are arranged in alternating manner.

According to an alternative design option, two partial drives are provided, respectively, on both sides of the gearbox, wherein each of these partial drives is preferably designed in the form of an electric motor with three phases. As a result, the system has a little longer extension in axial direction, but the electric motors which, on one side, form also a total of six phases are also separated from one another.

The one or multiple partial drives provided on one side of the gearbox, are in particular enclosed in a housing, in order to prevent to the extent possible interferences with the partial drive or partial drives from the outside.

A further embodiment provides that the partial drives are associated with a common input shaft of the gearbox. As a result, all partial drives of the electromagnetic drive unit drive via one and the same input shaft into the gearbox. It is further preferred that between the input shaft and the at least one partial drive provided on the respective side of the gearbox one separating clutch is arranged, respectively, by means of which it is possible to interrupt a mechanical connection of the input shaft to the at least one partial drive. As a result, further operation of the actuator can be ensured even when the one or multiple partial drives provided on this side of the gearbox are blocked. In this case, the mechanical connection is interrupted via the respective separating clutch, so that it is still possible to implement an actuation via the one or multiple partial drives situated on the respective other side of the gearbox.

According to a further embodiment, the gearbox comprises two input shafts, wherein one input shaft is associated with the at least one partial drive situated on one side of the gearbox, and the other input shaft is associated with the at least one partial drive situated on the other side of the gearbox. The gearbox then adds the driving power of the partial drives for actuation. Also in this way, it is still possible to implement a possibly limited control function of the actuator when one or multiple partial drives on one side are blocked.

In a further development, possibly in a further development of the above-mentioned embodiment, the gearbox is composed of multiple gear speeds. On the one hand, this can result in the fact that an appropriate gear ratio of drive movements of the partial drives can be realized. On the other hand, with appropriate nesting of the gear speeds, control function can be ensured even when a gear speed is blocked.

According to one design option, the gearbox is designed in the form of a planetary gear or a cycloidal gear. In both cases, it is possible to achieve a strong gearbox, wherein in a cycloidal gear the danger of blockage resulting from a tooth break is minimized.

FIG. 1 shows a schematic view of an actuator 1 according to a first embodiment. In particular, said actuator is provided in the range of rotor blade adjustment of a helicopter and is here part of a swashplate control system or individual rotor blade control system of the main or tail rotor blades of the helicopter. Alternatively, the actuator 1 can be used also in different areas of the helicopter, or a different aircraft, for example, an airplane, in order to implement control functions, for example, flap control or operating a control, such as an aileron or elevator.

As shown in FIG. 1, the actuator 1 comprises an electromagnetic drive unit 2, which is divided into multiple partial drives 3, 4, 5 and 6, and which is connected with an output drive 8 of the actuator 1 via a downstream gearbox 7. The output drive 8 is designed in the form of a control column, by means of which the rotary motion generated by the drive direction 2 and transmitted via the gearbox is transferred to further connected components.

The partial drives 3 to 6 of the drive unit 2 can be operated independently from one another, in order to arrange the actuator in the form of a redundant system. As result, each partial drive 3 to 6 is powered via a respectively associated supply line (lane) 9 or 10 or 11 or 12 which, in turn, respectively forms the connection to one respectively associated generator 13 or 14 or 15 or 16, each of which has a downstream rectifier 17 or 18 or 19 or 20. Moreover, each supply line 9 or 10 or 11 or 12 is supplied with a respective power control unit (PCU) 21 or 22 or 23 or 24, by means of which the energy is controlled which is supplied to the respectively associated partial drive 3 or 4 or 5 or 6.

Each power control unit 21 or 22 or 23 or 24, in turn, is associated with a respective actuator control unit (ACU) 25 or 26 or 27 or 28, each of which, for example, is provided with a respective bipolar transistor equipped with insulated gate bipolar transistor (IGBT) and controls the associated power control unit 21 or 22 or 23 or 24. For this purpose, each actuator control unit 25 or 26 or 27 or 28 is connected, respectively, with two sensors 29 and 30 or 31 and 32 or 33 and 34 or 35 and 36, wherein an angular position of an input shaft 37 of the gearbox 7 is measured, respectively, via the sensors 29, 31, 33 and 35, while the sensors 30, 32, 34 and 36 determine the respective angular position of the output drive 8. FIG. 1 shows that the actuator control units 25 to 28 are in data communication with the respectively associated flight control computers (FCC) 38 to 41.

In the present case, the gearbox 7 is designed in the form of a planetary gear and is composed of a sun gear 42, a planetary carrier 45 driving multiple planetary gears 43 and 44, and a ring gear 46. At the same time, the sun gear 42 is arranged in torque-proof manner on the common input shaft 37, which has the purpose of mutually connecting the rotors of the partial drives 3 to 6. Each of the planetary gears 43 and 44 with the radially extending internal sun gear 42, as well as with the surrounding ring gear 46, wherein the planetary carrier 45 driving the planetary gears 43 and 44 is stopped together with stators of the partial drives 3 to 6 while the ring gear 46 is connected in torque-proof manner with the output drive. In the process, a drive movement into slow motion on the output drive, depicted together with the partial drives 3 to 6, is transmitted via the gearbox 7.

As a special feature, the gearbox 7 is arranged between partial drives 3 and 4 on one side and partial drives 5 and 6 on the other side, so that partial drives 3 and 4 are physically separated from partial drives 5 and 6. In this way, it can be prevented that a fire starting, for example, on the side of partial drives 3 and 4 can result in direct damage to partial drives 5 and 6, and vice versa, because the partial drives are protected by the gearbox 7 situated between them. At the same time, each of the partial drives 3 to 6 is designed in the form of an electric motor, each having 3 phases. Furthermore, the partial drives 3 and 4 or 5 and 6 situated on the respective side of the gearbox 7 are arranged axially in consecutive order in relation to the input shaft 37 and respectively placed in a mutual housing 47 or 48.

Figure 2:
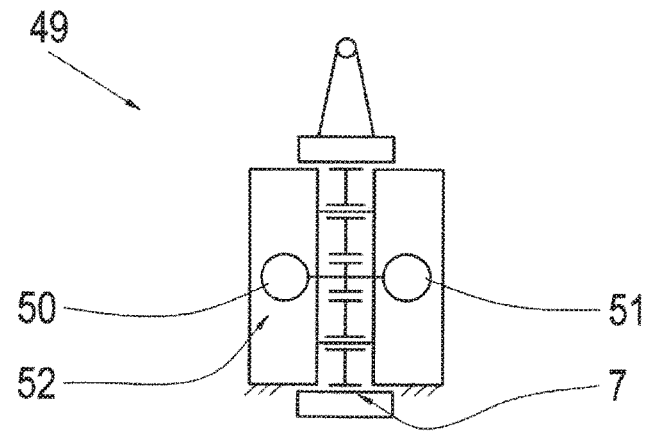
FIG. 2 a part of an actuator according to a second embodiment.
Figure 3:
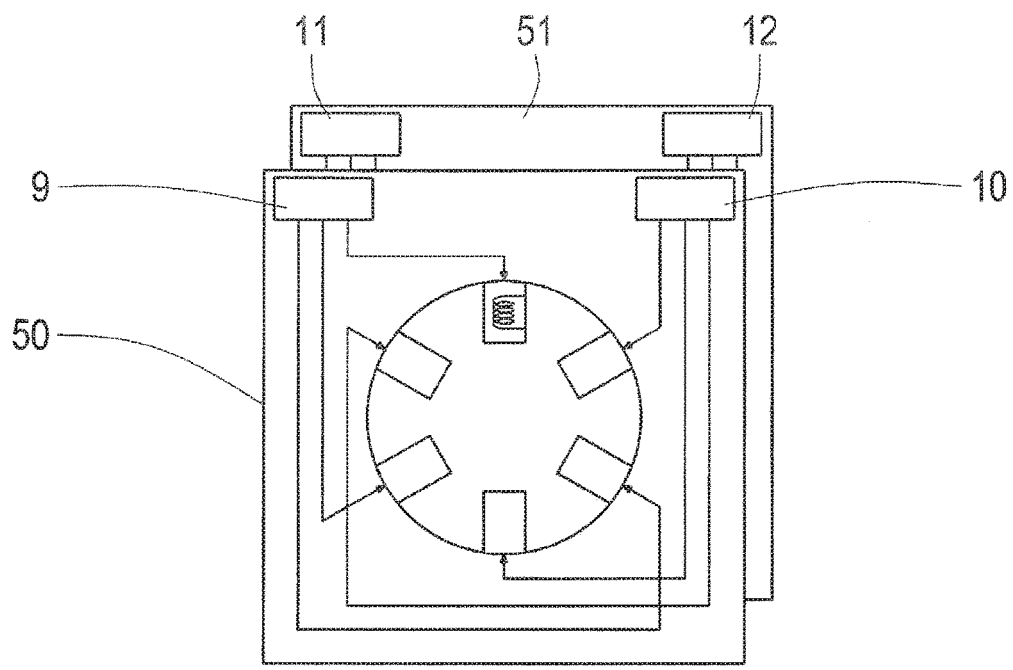
FIG. 3 a further schematic view of a part of the actuator shown in FIG. 2.

Furthermore, FIG. 2 shows a schematic view of part of an actuator 49 according to a second design option. In this case, the actuator 49 basically corresponds to the model shown in FIG. 1, wherein in contrast to the previous model only a total of two partial drives 50 and 51 of an electromechanical drive unit 52 is provided, which are separated from one another by the gearbox 7 situated between them. At the same time, each partial drive 50 or 51 is designed in the form of an electric motor with six phases, respectively, wherein each partial drive 50 or 51 is respectively powered via two supply lines 9 and 10 or 11 and 12, as shown in FIG. 3. The partial drive 50 shown in FIG. 3 demonstrates that each respective partial drive 50 or 51 comprises individual windings and is connected in alternating manner with one of the respectively associated supply line 9 an 10 or 11 and 12. In this respect, in accordance with the embodiment shown in FIGS. 2 and 3, two partial drives according to FIG. 1 are combined, respectively, to one partial drive 50 or 51. At the same time, it is important that an internal redundancy is formed within the respective partial drive 50 or 51 by performing a spatial, thermal, magnetic and electrical separation of the individual phases. In this way, the respective partial drive 50 or 51 can be still operated to the greatest possible extent when one of the phases fails. In all other aspects, the model shown in FIGS. 2 and 3 corresponds to the embodiment according to FIG. 1, so that we can refer to the above description.

Figure 4:
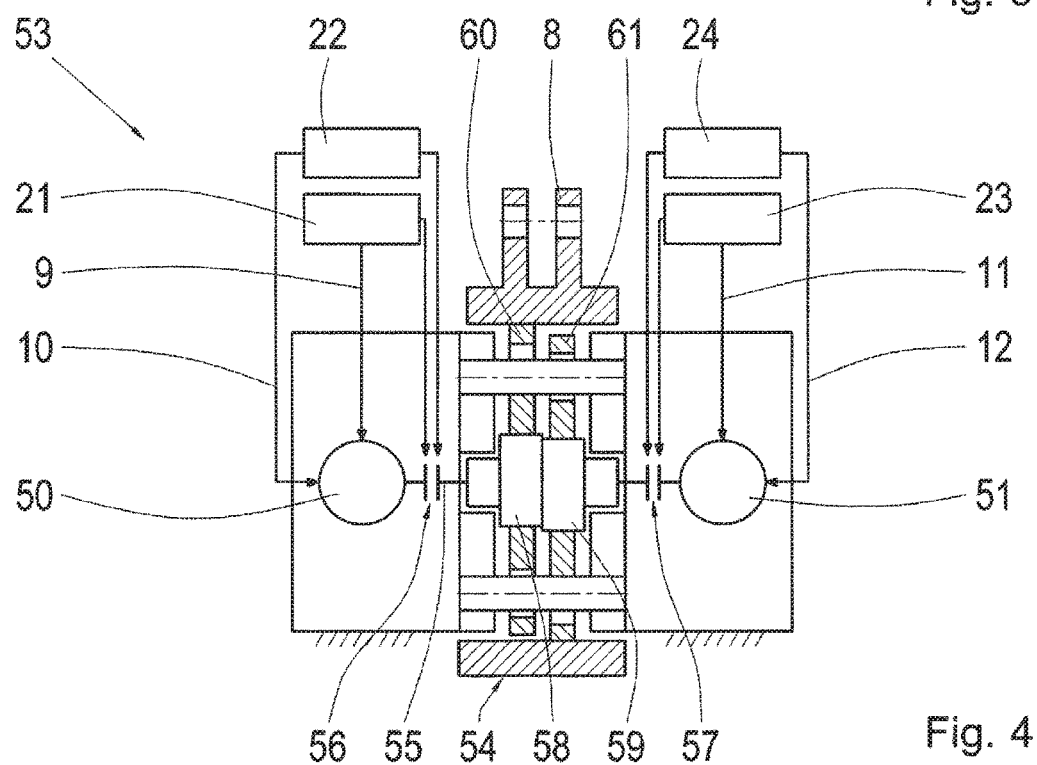
FIG. 4 a schematic depiction of an actuator according to a third embodiment.

FIG. 4 shows a schematic view of part of an actuator 53 according to a third embodiment, which again corresponds largely to the model according to FIG. 1. In contrast to the embodiment according to FIG. 1 and in accordance with the design options according to FIGS. 2 and 3, also here only two partial drives 50 and 51 are provided, which are designed in the form of electric motors with six phases and which are physically separated from one another by the gearbox situated between said partial drives.

However, each partial drive 50 or 51 is connected with a common input shaft 55 of the gearbox 54 by means of a respective separating clutch 56 or 57 situated between said partial drives. The separating clutch is connected in terms of control with the power control units 21 and 22 or 23 and 24 of the supply lines 9 and 10 or 11 and 12, which are associated with the respective partial drive 50 or 51. As a result, the power control units 21 and 22 or 23 and 24 can specifically cause the separating clutch 56 or 57 to open. As a result, the respective mechanical connection to the gearbox 54 can be specifically interrupted when one of the partial drives 50 or 51 is blocked and thus actuation can still be performed via the respective other partial drive 51 or 50.

A further difference is represented by the fact that the gearbox 54 in the model according to FIG. 4 is designed in the form of a cycloidal gear, in which two eccentrics 58 and 59 are provided on the input shaft 55. Said eccentrics are connected with the output drive 8 via a cam disc 60 or 61, respectively. Cycloidal gears do not involve the danger of tooth breaks, reducing considerably the risk of a possible blockage of the gearbox.

Figure 5:
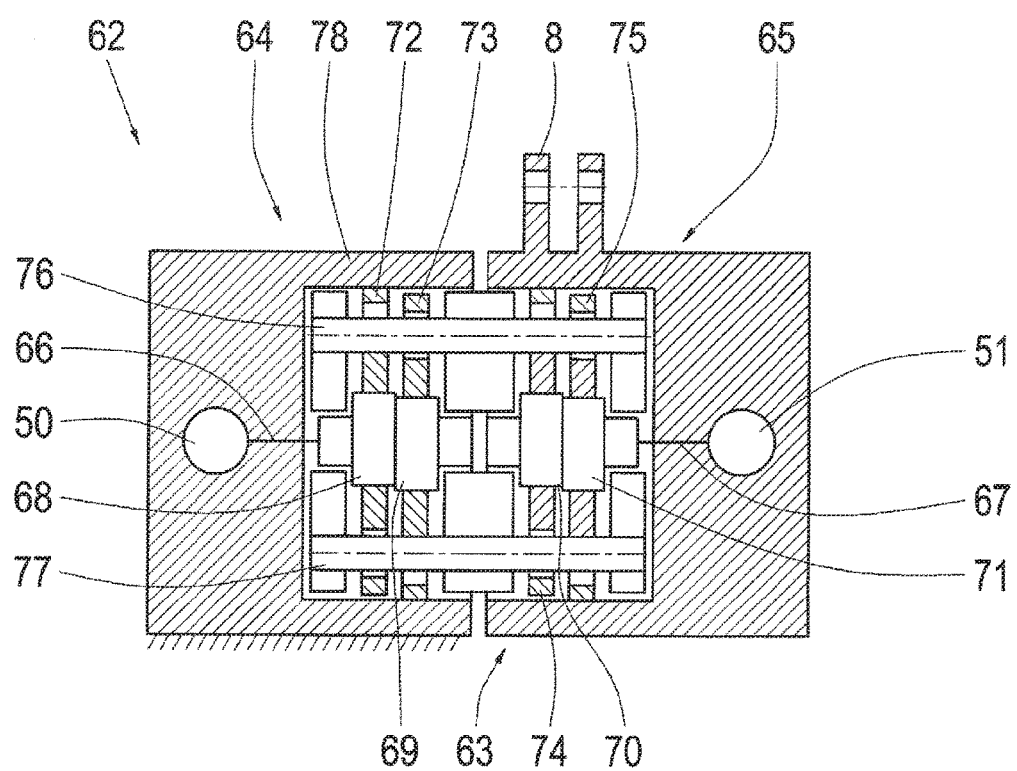
FIG. 5 a schematic view of an actuator according to a fourth embodiment.

Finally, FIG. 5 shows a schematic view of an actuator 62 according to a fourth embodiment. Basically, this actuator 62 corresponds to the actuator 49 shown in FIGS. 2 and 3, wherein a single difference involves the design of the gearbox 63. Like the model shown in FIG. 4, this gearbox 63 is designed also in the form of a cycloidal gear but, in this case, it is composed of two gear speeds 64 and 65, by means of which the drive movements of the partial drives 50 and 51 are added toward the output drive 8. For this purpose, the gearbox 63 has two input shafts 66 and 67, in which the input shaft 66 is connected with the partial drive 50 and the input shaft 67 is connected with the partial drive 51. Each input shaft 66 and 67, respectively, has a total of two eccentrics 68 and 69 or 70 and 71, which are, respectively, connected with and drive one cam disc 72 or 73 or 74 or 75. At the same time, all cam discs 72 to 75 have common studs 76 and 77, wherein the cam discs 72 and 73 are in contact in radially circumjacent manner with a fixed ring gear 78, while in the case of ring gears 74 and 75, a ring gear 79 is connected in torque-proof manner with the output drive 8. By constructing the gearbox 63 in this manner, it can be achieved that a possibly limited control function can still be implemented via the respectively other gear speed 64 or 65 even when one of the two gear speeds 64 or 65 is blocked.

By means of the current embodiments of an actuator, it is possible to reduce its susceptibility to damage and thus increase its reliability.

REFERENCE SYMBOLS 1 actuator
2 drive unit
3 partial drive
4 partial drive
5 partial drive
6 partial drive
7 gearbox
8 output drive
9 supply line
10 supply line
11 supply line
12 supply line
13 generator
14 generator
15 generator
16 generator
17 rectifier
18 rectifier
19 rectifier
20 rectifier
21 power control unit
22 power control unit
23 power control unit
24 power control unit
25 actuator control unit
26 actuator control unit
27 actuator control unit
28 actuator control unit
29 sensor
30 sensor
31 sensor
32 sensor
33 sensor
34 sensor
35 sensor
36 sensor
37 input shaft
38 flight control computer
39 flight control computer
40 flight control computer
41 flight control computer
42 sun gear
43 planetary gear
44 planetary gear
45 planetary carrier
46 ring gear
47 housing
48 housing
49 actuator
50 partial drive
51 partial drive
52 drive unit
53 actuator
54 gearbox
55 input shaft
56 separating clutch
57 separating clutch
58 eccentric
59 eccentric
60 cam disc
61 cam disc 62 actuator
63 gearbox
64 gear speed
65 gear speed
66 input shaft
67 input shaft
68 eccentric
69 eccentric
70 eccentric
71 eccentric
72 cam disc
73 cam disc
74 cam disc
75 cam disc
76 bolt
77 bolt
78 ring gear
79 ring gear

We claim:

1. An actuator for a rotor blade adjustment, comprising:
an electromechanical drive unit connected with an output drive via a gearbox, wherein the drive unit is connected to the gearbox via at least one input shaft; and
wherein the drive unit comprises at least a first partial drive and a second partial drive that can be operated independently from one another,
wherein the first partial drive, the gearbox, and the second partial drive are coaxial with, and arranged axially along, the at least one input shaft such that the gearbox is located between the first partial drive and the second partial drive to create a barrier between the first partial drive and the second partial drive, and
wherein the electromechanical drive unit further comprises third and fourth partial drives, wherein the first and third partial drives are located on a first side of the gearbox, and wherein the second and fourth partial drives are located on a second side of the gearbox.

2. The actuator of claim 1, wherein the first and second partial drives comprise an electric motor with six phases.

3. The actuator of claim 1, wherein the first and second partial drives each include an electric motor with three phases.

4. The actuator of claim 1, wherein the at least one input shaft comprises a common input shaft associated with the first and second partial drives.

5. The actuator of claim 4, wherein a separating clutch is located between the input shaft and at least one of the first and second partial drives, and wherein the separating clutch is configured to interrupt a mechanical connection of the input shaft.

6. The actuator of claim 1, wherein the at least one input shaft is one of two input shafts, wherein one of the input shafts is associated with the first partial drive located on the first side of the gearbox, and wherein the other input shaft is associated with the second partial drive situated on the second side of the gearbox, and wherein the gearbox connects the first and second partial drives with the output drive.

7. The actuator according to claim 1, wherein the gearbox comprises multiple gear speeds.

8. The actuator of claim 1, wherein the gearbox comprises a planetary gear or a cycloidal gear.

9. An actuator for aviation applications, the actuator comprising:
a drive unit having at least a first partial drive and a second partial drive;
a gearbox connected to the drive unit, wherein the drive unit is connected to the gearbox via at least one input shaft; and
an output drive connected to the gearbox,
wherein the first partial drive, the gearbox, and the second partial drive are coaxial with, and arranged axially along, at least one input shaft such that the first partial drive is located on a first side of the gearbox and the second partial drive is located on a second side of the gearbox and such that the gearbox forms a barrier between the first partial drive and the second partial drive, and
wherein the drive unit further comprises third and fourth partial drives connected to the gearbox.

10. The actuator of claim 9, wherein the first side is opposite of the second side.

11. The actuator of claim 9, wherein the first and second partial drives each comprise an electric motor with six phases.

12. The actuator of claim 9, wherein the first and third partial drives are located on the first side of the gearbox, and wherein the second and fourth partial drives are located on the second side of the gearbox.

13. The actuator of claim 9, wherein the first, second, third, and fourth partial drives each comprise an electric motor with three phases.

14. The actuator of claim 9, wherein the at least one input shaft comprises a common input shaft associated with the first and second partial drives.

15. The actuator of claim 9, further comprising a separating clutch located between the first partial drive and the gearbox.

16. The actuator of claim 9, wherein the gearbox comprises multiple gear speeds.

* * * * *